United States Patent

Chen

[11] Patent Number: 5,267,521
[45] Date of Patent: Dec. 7, 1993

[54] PATTERN GENERATOR MECHANISM FOR ZIG-ZAG SEWING MACHINE

[75] Inventor: Kuan-Neng Chen, Taichung, Taiwan
[73] Assignee: The Singer Company NV, Curacao, Netherlands Antilles
[21] Appl. No.: 986,319
[22] Filed: Dec. 7, 1992
[51] Int. Cl.⁵ .................. D05B 3/02; F16H 25/14
[52] U.S. Cl. ................................ 112/459; 74/57; 74/567
[58] Field of Search ............. 112/459, 460, 464, 465, 112/466; 74/569, 53, 54, 55, 56, 57, 567

[56] References Cited

U.S. PATENT DOCUMENTS

| | | | |
|---|---|---|---|
| 573,881 | 12/1896 | Jagielski | 112/459 |
| 776,822 | 12/1904 | Abercrombie | 112/459 |
| 1,116,679 | 11/1914 | Dashew | 112/459 |

*Primary Examiner*—Peter Nerbun

[57] ABSTRACT

A pattern generator for use in a zig-zag sewing machine wherein a needle bar is moved back and forth in an oscillatory movement to produce zig-zag action as a consequence of rotation of an arm shaft. The shaft rotates at a constant angular velocity with the period of time required for one cycle of oscillatory movement of the needle bar being equal to the period of time for two successive complete revolutions of the shaft. The generator includes a rotatable cam connected to the shaft to rotate the cam at the same velocity as the arm. A slide block follower engages the cam. The block has raised, intermediate and lowered positions in the cam and moves smoothly between these positions as the cam is rotated. The follower is placed in the lowered position at the start of the first revolution and moves smoothly into the raised position upon completion of the first revolution which is coincident with the start of the second revolution, the follower then moving smoothly into the lowered position upon completion of the second revolution which is coincident with the start of the first revolution.

6 Claims, 2 Drawing Sheets

PATTERN GENERATOR MECHANISM FOR ZIG-ZAG SEWING MACHINE

BACKGROUND OF THE INVENTION

In zig-zag sewing machines, a needle bar to which a needle is attached must be moved back and forth in an oscillatory movement. A machine of this type utilizes a pattern generator to produce this movement. To this end, a worm gear is mounted on the arm shaft of the machine. When the arm shaft rotates, the worm gear drives a cam-gear set with a constant angular velocity ratio. As the cam is rotated, the cam follower exhibits a back and forth motion. This motion is translated to the needle bar through known mechanisms and causes the needle bar to move in the desired manner.

The present invention is directed toward a new mechanism utilized in a pattern generator which is simplified in structure and can be manufactured at lower cost.

SUMMARY OF THE INVENTION

Accordingly, it is an object of the present invention to provide a new and improved mechanism for use in a pattern generator which is simplified in structure and can be manufactured at lower cost.

Another object is to provide a mechanism of the character indicated which employs a novel cam and follower structure.

Yet another object is to provide a new and improved cam structure which cooperates with a slide block cam follower.

These and other objects of the invention will either be explained or will become apparent hereinafter.

In accordance with the principles of this invention, a pattern generator is adapted for use in a zig-zag sewing machine wherein a needle bar is moved back and forth in an oscillatory movement to produce the zig-zag action as a consequence of rotation of an arm shaft. This shaft rotates at a constant angular velocity with the period of time required for one cycle of oscillatory movement of the needle bar being equal to the period of time for two successive complete revolutions of the shaft.

The generator employs a rotatable cam which is connected to the shaft and rotates at the same velocity as the arm.

A slide block follower engages the cam. The block has raised, intermediate and lowered positions in the cam and moves smoothly between said positions as the cam is rotated. The follower is placed in the lowered position at the start of the first revolution and moves smoothly into the raised position upon completion of the first revolution which is coincident with the start of the second revolution. The follower then moves smoothly into the lowered position upon completion of the second revolution which is coincident with the start of the first revolution.

Since this invention uses an up and down motion of a slide block follower rather than a back and forth motion of a follower as previously employed, it is necessary to convert the up and down motion to a back and forth motion before a known translation mechanism can transfer the back and forth motion to the needle bar. To this end, a vertical to horizontal motion converter connects the slide block follower to the translation mechanism.

DETAILED DESCRIPTION OF PREFERRED EMBODIMENT

Figures 1, 3:
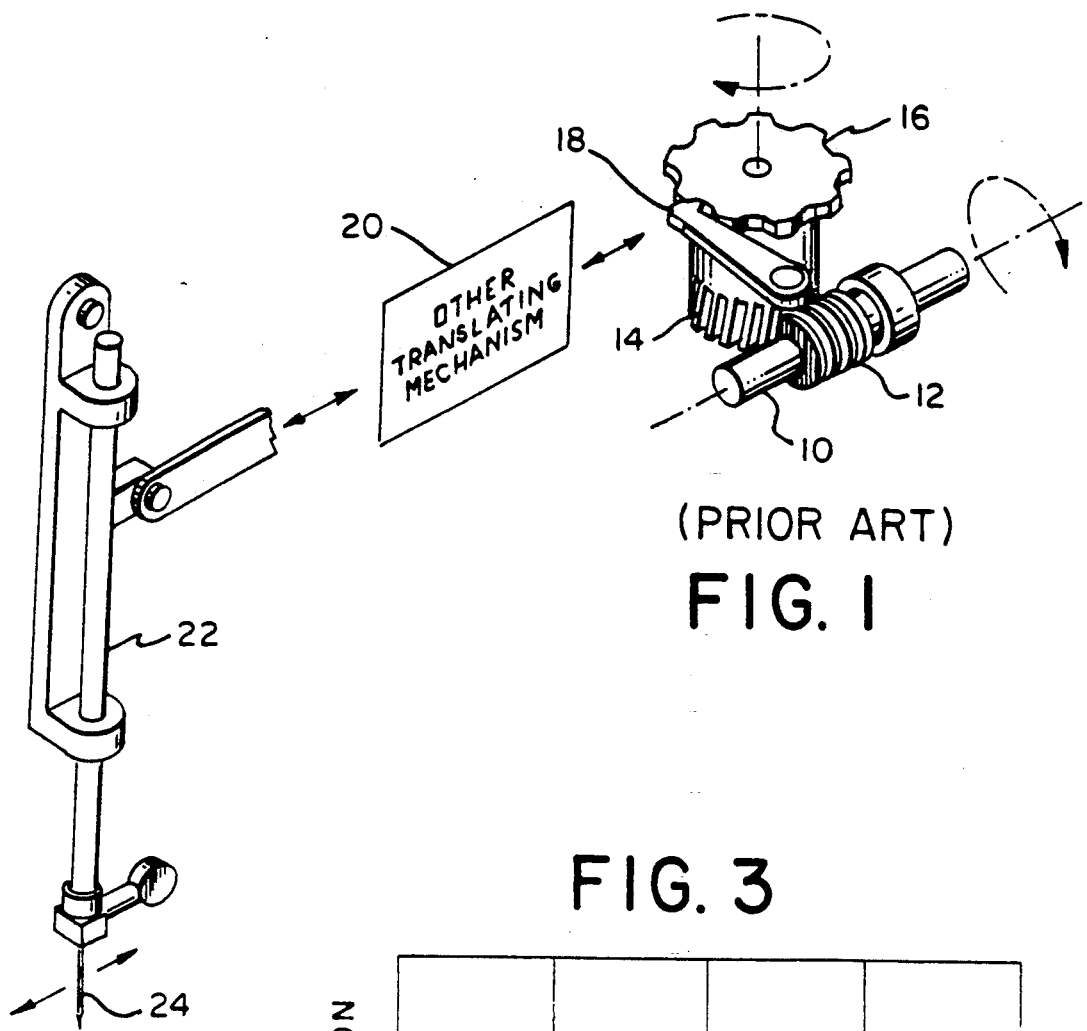
FIG. 1 is an exploded view of a prior art pattern generator.
FIG. 3 is a graph of the needle position as a function of the arm shaft rotating cycle as utilized in each of the structures shown in FIGS. 1 and 2.

Referring first to the prior art structure shown in FIG. 1, arm shaft 10 carries a worm gear 12. Gear 12 engages gear 14 of cam 16, causing cam 16 to rotate at a constant velocity ratio of 1/18 of that of the arm shaft. A cam follower 18 is moved back and forth by the rotation of cam 16. This motion is transferred by a known translating mechanism 20 to needle bar 22. The needle bar has a needle 24 detachably secured thereto.

Needle position as a function of shaft rotation for two successive revolutions of the shaft is shown in FIG. 3. This function is required for proper zig-zag operation. In accordance with this function, the time of the needle bar to complete one cycle of oscillatory motion must be equal to the time required for the arm shaft to complete two successive rotations of 360 degrees each.

Figure 2:
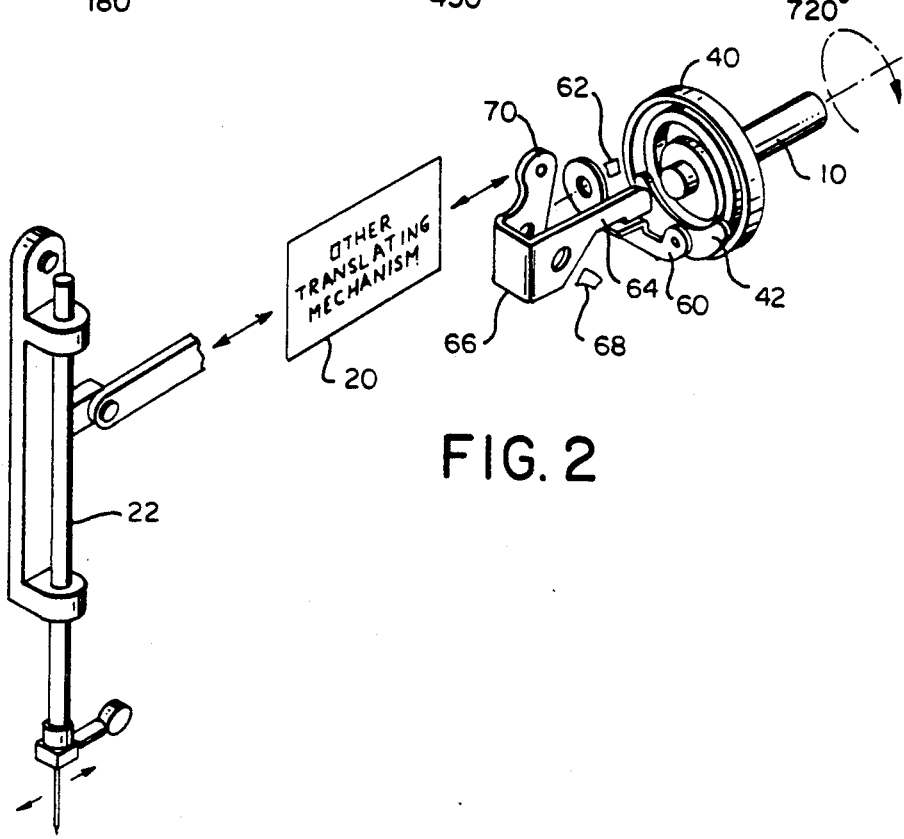
FIG. 2 is an exploded view of a preferred embodiment of the invention.

Referring now to FIG. 2, a novel cam 40 is connected to arm shaft 10 and rotates at the same velocity as the shaft. A slide block follower 42 engages the cam.

Figure 4:
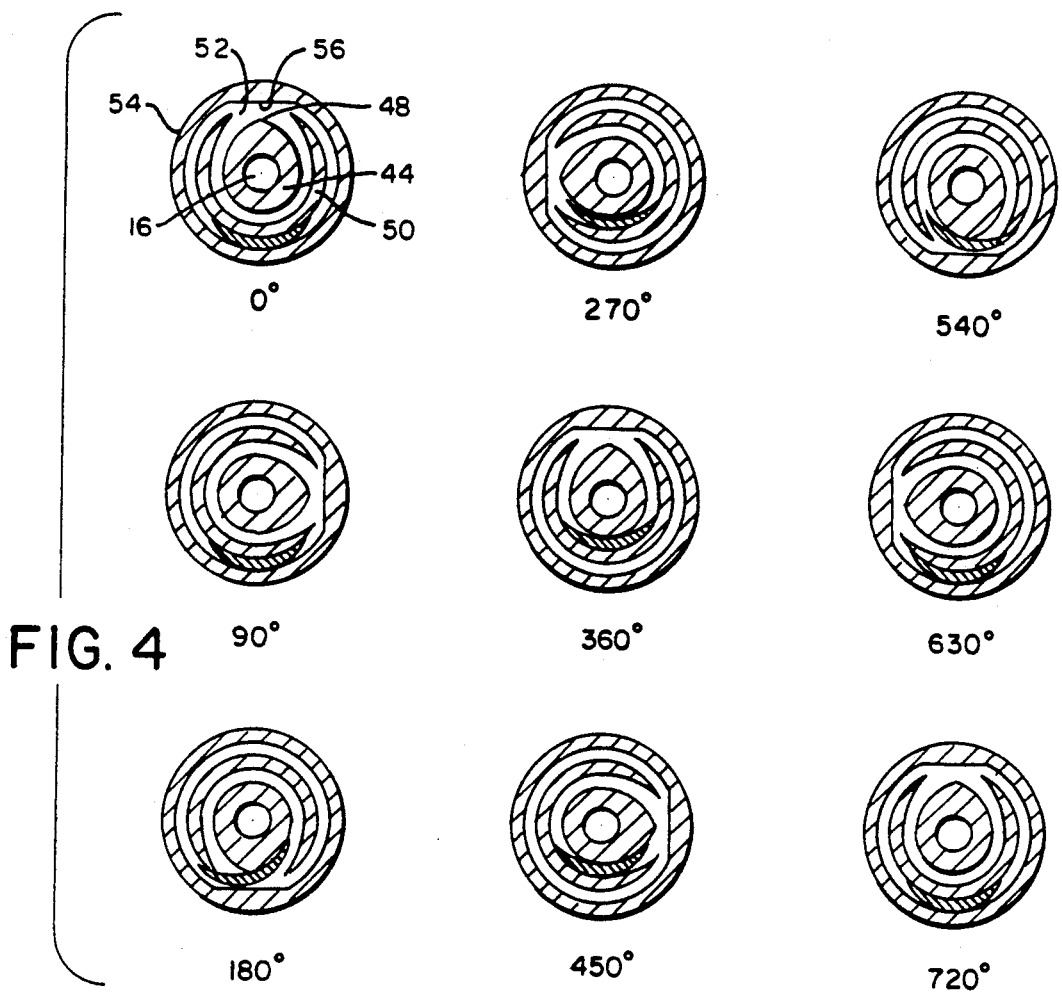
FIG. 4 illustrates the positions of the cam and slide block follower at various positions of rotation of the cam and arm shaft as the cam and arm shaft rotate through two complete revolutions.

The cam 40 as shown in cross section in FIG. 4 includes a first cylinder 44 having a central opening 46 through which shaft 10 extends. Cylinder 44 has an outer surface which is circular except for a first outwardly extending node 48.

A second hollow cylinder 50 is spaced outwardly from and is concentrically disposed about the first cylinder. Cylinder 50 has circular inner and outer surfaces with an opening 52 extending therethrough. The first node extends into the opening.

A third hollow cylinder 54 is spaced outwardly from and is concentrically disposed about the second cylinder. Cylinder 54 has an inner surface which is circular except for a second inwardly extending node 56 which is spaced from the opening and the first node and is aligned with the first node.

Each complete revolution of the cam and shaft is defined by 360 degrees of arc, and two complete revolutions [totalling 720 degrees of arc] are shown in FIG. 4. The structure shown in FIG. 2 exhibits the same function shown in FIG. 3. The aligned nodes point vertically upward at 0 degrees and as measured in the clockwise direction point horizontally to the right at 90 degrees, point vertically downward at 180 degrees, point horizontally to the left at 270 degrees and point vertically upward at 360 degrees.

As shown in FIG. 4, the slide block follower 42 is disposed between the second and third cylinders and is spaced by 180 degrees from the vertically upwardly pointing nodes in its lowered position. The follower is disposed between the first and second cylinders and spaced by 180 degrees from the vertically upwardly pointing nodes in its raised position. The follower extends through the opening, partially extending between the first and second cylinders and at the same time partially extending between the second and third cylinders while being adjacent the vertically downwardly pointed nodes in its intermediate position. The slide block follower thus exhibits an up and down motion.

In order to convert the up and down motion to back and forth motion, an elongated member 60 is pivotally secured at one end to the midpoint of the slide block. The other end of the member 60 is rotatable about a horizontal shaft 62 which is parallel to the arm shaft. The center of member 60 engages an elonged arm 64 of bracket 66 pivotally rotatable about another horizontal shaft 68 which extends at right angles to the arm shaft. As a result, upright arm 70 of bracket 66, disposed at right angles to arm 64, is moved back and forth. Mechanism 20 transfers this motion to the needle bar 22.

While the invention has been described with particular reference to the preferred embodiment, the protection sought is to be limited only by the claims which follow.

What is claimed is:

1. A pattern generator for use in a zig-zag sewing machine wherein a needle bar is moved back and forth in an oscillatory movement to produce zig-zag action as a consequence of rotation of an arm shaft, rotating at a constant angular velocity with the period of time required for one cycle of oscillatory movement of the needle bar being equal to the period of time for two successive complete revolutions of the shaft, said generator comprising:
   a rotatable cam;
   means connecting the cam to the arm shaft to rotate the cam at the same velocity as the arm shaft; and
   a slide block follower engaging said cam, said block having raised, intermediate and lowered positions in the cam and moving smoothly between said positions as the cam is rotated, means for placing the follower in the lowered position at the start of the first revolution and for moving the follower smoothly into the raised position upon completion of the first revolution, the completion of the first revolution being coincident with the start of the second revolution, the follower moving smoothly into the lowered position upon completion of the second revolution which is coincident with the start of the first revolution.

2. The generator of claim 1 further including means connected to the slide block follower to convert the up and down motion of the follower into a back and forth motion.

3. The generator of claim 2 wherein said means includes an elongated member pivotally secured at one end to the center of the follower, the other end being rotatably secured about another shaft which is horizontal and parallel to the arm shaft, and a bracket pivotally secured to another shaft which is horizontal and perpendicular to the arm shaft, the bracket having a first elongated arm engaging the center of the member and a second elongated arm disposed at right angles to the first arm, said second arm exhibiting the back and forth motion.

4. The generator of claim 1 wherein the cam in cross section comprises:
   a first cylinder connected to the shaft, said first cylinder having an outer surface which is circular except for a first outwardly extending node;
   a second hollow cylinder spaced outwardly from and concentrically disposed about the first cylinder, the second cylinder having circular inner and outer surfaces with an opening extending therethrough, the first node extending into the opening; and
   a third hollow cylinder spaced outwardly from and concentrically disposed about the second cylinder, the third cylinder having an inner surface which is circular except for a second inwardly extending node which is spaced from the opening and the first node and is aligned with the first node.

5. The generator of claim 4 wherein the each complete revolution of the cam and shaft is defined by 360 degrees of arc, the aligned nodes pointing vertically upward at 0 degrees and as measured in the clockwise direction pointing horizontally to the right at 90 degrees, pointing vertically downward at 180 degrees, pointing horizontally to the left at 270 degrees and pointing vertically upward at 360 degrees.

6. The generator of claim 5 wherein the slide block follower is disposed between the second and third cylinders and is spaced by 180 degrees from the vertically upwardly pointing nodes in its lowered position, the follower being disposed between the first and second cylinders and spaced by 180 degrees from the vertically upwardly pointing nodes in its raised position, the follower extending through the opening to partially extend between the first and second cylinders and to partially extend between the second and third cylinders while being adjacent the vertically downwardly pointed nodes in its intermediate position.

* * * * *